(12) United States Patent
Pullen

(10) Patent No.: US 7,916,731 B2
(45) Date of Patent: Mar. 29, 2011

(54) METHOD AND SYSTEM FOR EFFICIENT RAPID LOSS DETECTION IN A BONDING SYSTEM

(75) Inventor: David Michael Pullen, Hayesville, NC (US)

(73) Assignee: Broadcom Corporation, Irvine, CA (US)

(*) Notice: Subject to any disclaimer, the term of this patent is extended or adjusted under 35 U.S.C. 154(b) by 302 days.

(21) Appl. No.: 11/606,095

(22) Filed: Nov. 30, 2006

(65) Prior Publication Data

US 2008/0130649 A1 Jun. 5, 2008

(51) Int. Cl.
*H04L 12/28* (2006.01)
(52) U.S. Cl. .................. 370/394; 370/392; 370/412
(58) Field of Classification Search ............ 370/412–418
See application file for complete search history.

(56) References Cited

U.S. PATENT DOCUMENTS

| | | | |
|---|---|---|---|
| 4,644,533 A * | 2/1987 | Braff et al. ................. 370/411 |
| 6,279,084 B1 * | 8/2001 | VanDoren et al. ............ 711/141 |
| 6,738,379 B1 * | 5/2004 | Balazinski et al. ........... 370/394 |
| 6,785,236 B1 * | 8/2004 | Lo et al. ..................... 370/235 |
| 7,072,342 B1 * | 7/2006 | Elnathan .................... 370/394 |
| 7,260,085 B2 * | 8/2007 | Dobbins et al. .............. 370/352 |
| 7,301,917 B2 * | 11/2007 | Su ............................. 370/322 |
| 7,400,629 B2 * | 7/2008 | Blanc et al. ................. 370/394 |
| 7,454,456 B2 * | 11/2008 | Banerjee et al. ............. 709/201 |
| 7,751,404 B2 * | 7/2010 | Pullen et al. ................ 370/394 |
| 7,773,602 B2 * | 8/2010 | Blanc et al. ................. 370/394 |
| 7,787,446 B2 * | 8/2010 | Le Maut et al. .............. 370/387 |
| 2003/0169740 A1 * | 9/2003 | Harris et al. ................. 370/394 |
| 2006/0039380 A1 * | 2/2006 | Cloonan et al. ............. 370/395.4 |
| 2006/0126660 A1 * | 6/2006 | Denney et al. ............... 370/468 |
| 2006/0133378 A1 * | 6/2006 | Patel .......................... 370/394 |
| 2007/0032256 A1 * | 2/2007 | Kolze ......................... 455/522 |
| 2007/0097907 A1 * | 5/2007 | Cummings .................. 370/329 |
| 2007/0110087 A1 * | 5/2007 | Abel et al. ................... 370/412 |
| 2007/0206600 A1 * | 9/2007 | Klimker et al. .............. 370/394 |

* cited by examiner

*Primary Examiner* — Michael J Moore, Jr.
(74) *Attorney, Agent, or Firm* — Sterne, Kessler, Goldstein & Fox P.L.L.C.

(57) ABSTRACT

An apparatus, method, and computer program for efficient rapid loss detection in a channel bonding system. A received packet having a packet sequence number (PSN) not equal to a next expected PSN is queued. A channel counter for a first channel on which the received packet was received is incremented. If all channel counters are non-zero, increment the next expected PSN to equal a lowest queued packet PSN. Forward the queued packet with the lowest queued packet PSN. Decrement a channel counter for a second channel from which the lowest PSN packet is forwarded.

21 Claims, 6 Drawing Sheets

| Time | Channel | | | | Channel Counter | | | | Next Expected PSN |
|---|---|---|---|---|---|---|---|---|---|
| | 0 | 1 | 2 | 3 | 0 | 1 | 2 | 3 | |
| 7 | | | | | | | | | 21 |
| 6 | | | | | | | | | 21 |
| 5b | | | | | 0 | 0 | 0 | | 15 → 21 |
| 5a | 19 | | | | 1 | 2 | 1 | | 15 |
| 4b | | | 18 | | 0 | 2 | 0 | | 15 |
| 4a | | 20 | | | 0 | 2 | 0 | | 15 |
| 3 | | 16 | ~~17~~ | | 0 | 1 | 0 | | 15 |
| 2c | | | 12 | | 2 | 0 | 0 | | 10 → 15 |
| 2b | | ~~15~~ | | | 2 | 1 | 1 | | 10 |
| 2a | 14 | 11 | | | 1 | 1 | 0 | | 10 |
| 1b | | 13 | | | 1 | 0 | 0 | | 10 |
| 1a | ~~10~~ | | | | 0 | 0 | 0 | | 10 |
| 0 | | | | | | | | | 10 |

Finish ← → Start

FIG. 4

METHOD AND SYSTEM FOR EFFICIENT RAPID LOSS DETECTION IN A BONDING SYSTEM

FIELD OF THE INVENTION

The present invention is generally directed to communication systems. More particularly, the invention relates to channel bonding.

BACKGROUND OF THE INVENTION

Channel bonding is a process of communicating information through multiple independent communication channels. The multiple channels are treated as a single virtual channel having greater bandwidth than any individual constituent channel. In one method of channel bonding, a transmitter breaks a data stream into multiple packets of data. The transmitter distributes the packets among the each of the individual channels. The packets are tagged with a sequence number by the transmitter so that the receiver may resequence the packets to reproduce the data stream in the proper order.

The receiver queues in memory received packets that are not yet resequenced. When a packet is lost during transmission, for example due to an error, the receiver awaits arrival of the wayward packet. While waiting, the receiver buffers packets received after the expected arrival time of the lost packet. Eventually, a timer in the receiver runs out of time and signals resumption of resequencing without the lost packet. The wait for a lost packet is a long delay, such as twenty milliseconds or longer. This delay causes further problems with processing of the resequenced data because downstream processing equipment must adapt to variable and excessive delays in data delivery. Thus, conventional receiver systems require a large buffer, a large number of gates, a high-capacity random access memory, and per-channel first-in, first-out circuits to accommodate packet queuing during the long delay.

What is needed is a system, method, and computer product that improves upon traditional channel bonding systems, methods, and computer program products.

BRIEF SUMMARY OF THE INVENTION

An apparatus, method, and computer program for efficient rapid loss detection in a channel bonding system. A received packet having a packet sequence number (PSN) not equal to a next expected PSN is queued. A channel counter for a first channel on which the received packet was received is incremented. If all channel counters are non-zero, the next expected PSN is incremented to equal a lowest queued packet PSN. The queued packet with the lowest queued packet PSN is forwarded. A channel counter for a second channel from which the lowest PSN packet is forwarded is decremented.

BRIEF DESCRIPTION OF THE DRAWINGS/FIGURES

The accompanying drawings, which are incorporated herein and form a part of the specification, illustrate the present invention and, together with the description, further serve to explain the principles of the invention and enable a person skilled in the pertinent art to make and use the invention.

In the drawings:

FIG. 4 illustrates an exemplary application of efficient rapid loss detection.

Figure 1:
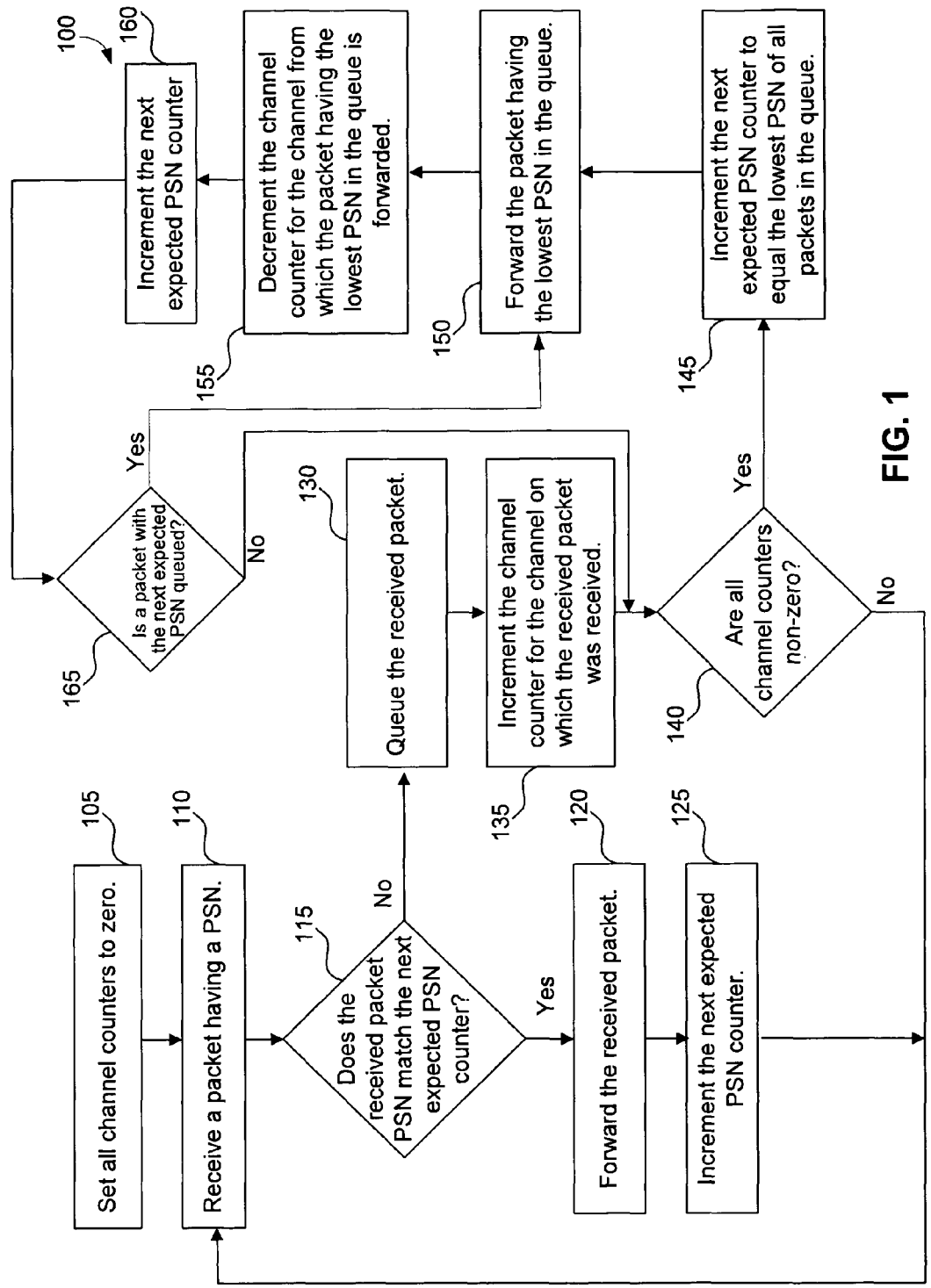
FIG. 1 is a flowchart of a method for efficient rapid loss detection.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

As introduced above, various embodiments of the invention involve an apparatus, method, and computer program for efficient rapid loss detection in a bonding system. FIGS. 1-6, described below, illustrate this approach. Examples of the invention reduce a receiver delay and reduce receiver hardware requirements by rapidly and efficiently detecting lost data.

This specification discloses one or more embodiments that incorporate the features of this invention. The disclosed embodiment(s) merely exemplify the invention. The scope of the invention is not limited to the disclosed embodiment(s). The invention is defined by the claims.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure, or characteristic. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments, whether or not explicitly described.

Channel bonding is a process of communicating information through multiple channels. The multiple channels are treated as a single virtual channel having greater bandwidth than any individual constituent channel. There are many methods of channel bonding. In one method, a transmitter distributes packets of data among each of the individual channels. The distribution may be based on load balancing, rate limiting, or another distribution method. Another method of channel bonding concatenates a series of data packets into a byte stream and then subdivides the byte stream into segments for transmission via the multiple channels. The methods described herein may be performed on segments instead of packets.

As used herein, "RCS" refers to a receive channel set. The RCS is a set of communications channels from which a receiver may receive data. Each channel in the RCS has a channel identification (CID). The CID identifies a channel upon which a packet may be received.

The term "BCS" refers to a bonding channel set. The BCS is a subset of the RCS channels that the transmitter and the receiver use for exchange of data associated with a particular bonding session. The BCS may contain all channels in the RCS. Alternatively, multiple BCSs may simultaneously coexist in the RCS.

A "bonding session" is information used by the transmitter and the receiver to perform channel bonding. Multiple bonding sessions may occur simultaneously on an RCS. A downstream service identifier (DSID) identifies a particular bonding session. The transmitter transmits the DSID with the packet so the receiver may associate the packet with a specific bonding session.

A packet sequence number (PSN) identifies a packet in the bonding session relative to other packets in the bonding session. A packet may be referred to by its PSN, for example, a packet having a PSN of eighty may be referred to as packet eighty. A series of PSNs are assigned to a series of packets in a sequential order determined by an order of packet transmission. The PSN identifies the packet so the receiver may resequence multiple packets in a specific bonding session. Resequencing ensures data is not delivered out of order to an end user.

For rapid loss detection to be employed, multiple packets are transmitted on a channel in order of increasing PSN. Thus, the transmitter may transmit packet three and then packet five. However, the transmitter may not transmit packet five and then packet three.

Within the receiver, each individual channel in each bonding session has a channel counter and a queue. The channel counter counts a number of packets in the queue for the respective channel. Thus, there are at least two channel counters because there are at least two communication channels. The receiver queues a packet when the receiver receives the packet and the PSN of the received packet does not match the next expected PSN. The next expected PSN identifies the PSN of the next packet to be forwarded from the bonding system to the end user of the transmitted data. The next expected PSN may be implemented in a separate PSN counter.

A communication system implementing channel bonding such as downstream bonding, upstream bonding, segment-based bonding, as well as bonding in non-DOCSIS systems may use efficient rapid loss detection. Communication equipment that exploits conventional methods of detecting lost data on multiple channels may also use efficient rapid loss detection. For example, the communication equipment may be at least one of a digital subscriber line (DSL) device, a cable modem (CM), a cable modem termination system (CMTS), and a wireless device.

FIG. 1 is a flowchart of a method 100 for efficient rapid loss detection in a bonding system. In step 105, all channel counters are set to zero. In step 110, a packet having a PSN is received. There may be an additional step to select a bonding session based on the DSID. In step 115, it is determined if the received packet's PSN matches the next expected PSN. If the received packet's PSN matches the next expected PSN, step 120 is performed. If the received packet's PSN does not match the next expected PSN, step 130 is performed. In step 120, the received packet is forwarded for further processing. In step 125, the next expected PSN is incremented. Step 110 is then performed.

In step 130, the received packet's PSN does not match the next expected PSN. The received packet is queued. In step 135, the channel counter for the channel on which the received packet was received is incremented because there is now one additional packet in the queue. In step 140, it is determined if all channel counters in the bonding session are non-zero. If all channel counters are non-zero, step 145 is performed. If any channel counter is zero, step 110 is performed. So long as any of the channel counters in the bonding session are zero, there is not a packet queued for every channel in the BCS. Thus, when all channel counters in the bonding session are non-zero, at least one packet is queued for every individual channel in the BCS.

In step 145, the next expected PSN is incremented until the next expected PSN equals the lowest PSN of all queued packets. In step 150, a packet having the lowest PSN of all packets in the queue is forwarded. In step 155, the channel counter for the channel from which the packet having the lowest PSN in the queue was forwarded is decremented. In other words, the channel counter associated with the packet that was forwarded in step 150 is decremented since that queue now has one less packet. In step 160, the next expected PSN counter is incremented. In step 165, it is determined if a packet with the next expected PSN is queued. If a packet with the next expected PSN is queued, step 150 is performed. If a packet with the next expected PSN is not queued, step 140 is performed.

Figure 2:
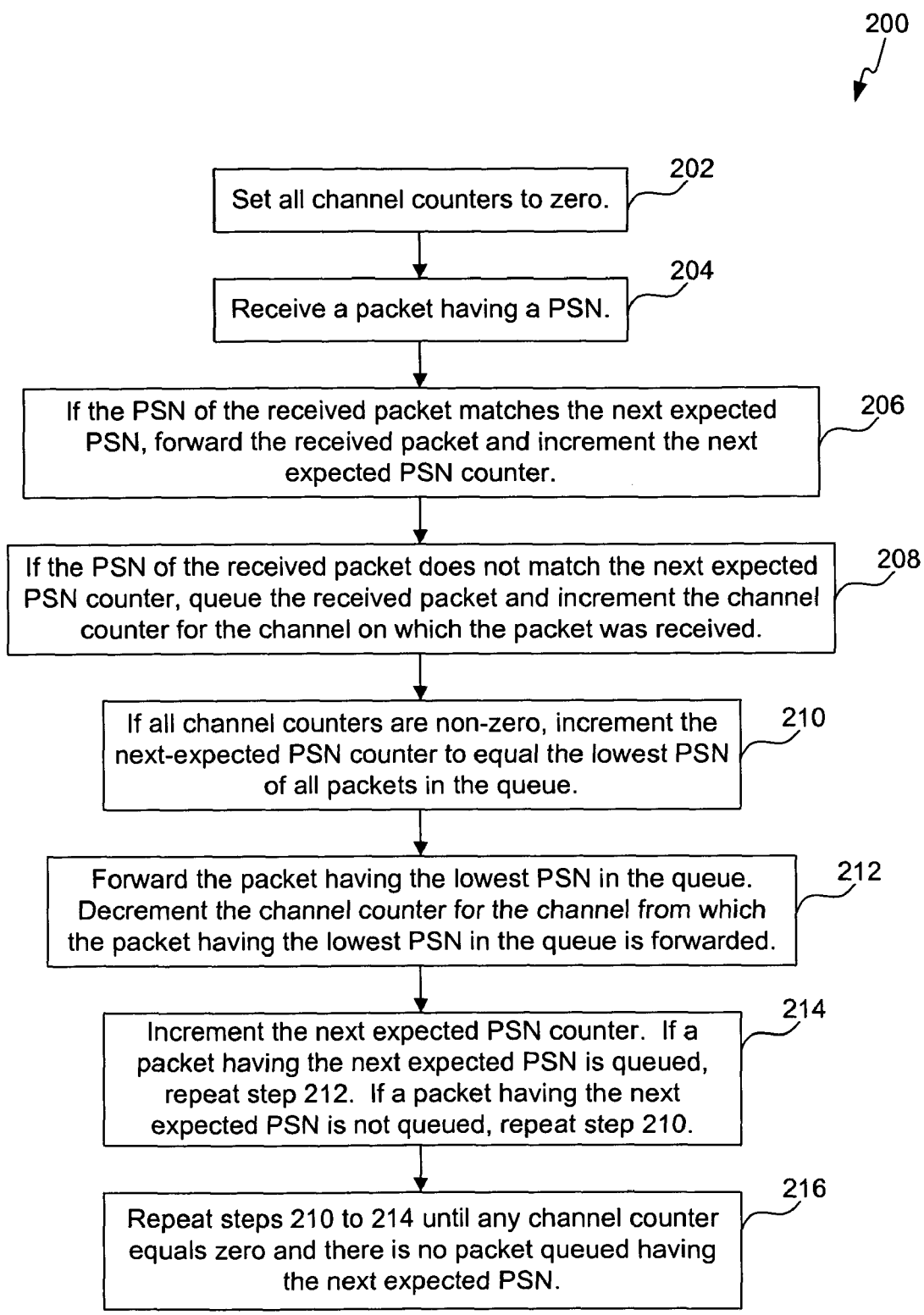
FIG. 2 is a flowchart of another method for efficient rapid loss detection.

FIG. 2 is a flowchart of another method 200 for efficient rapid loss detection in a bonding system. In step 202, all channel counters are set to zero. In step 204, a packet having a PSN is received. In step 206, if the PSN of the received packet matches the next expected PSN, the received packet is forwarded and the next expected PSN counter is incremented. In step 208, if the PSN of the received packet does not match the next expected PSN counter, the received packet is queued and the channel counter for the channel on which the packet was received is incremented. In step 210, if all channel counters are non-zero, the next-expected PSN counter is incremented to equal the lowest PSN of all packets in the queue. In step 212, the packet having the lowest PSN in the queue is forwarded. The channel counter for the channel of that packet is decremented. In step 214, the next expected PSN is incremented. If a packet having the next expected PSN is queued, repeat step 212. If a packet having the next expected PSN is not queued, repeat step 210. In step 216, steps 210 through 214 are repeated until any channel counter equals zero and there is no packet queued having the next expected PSN.

Figure 3:
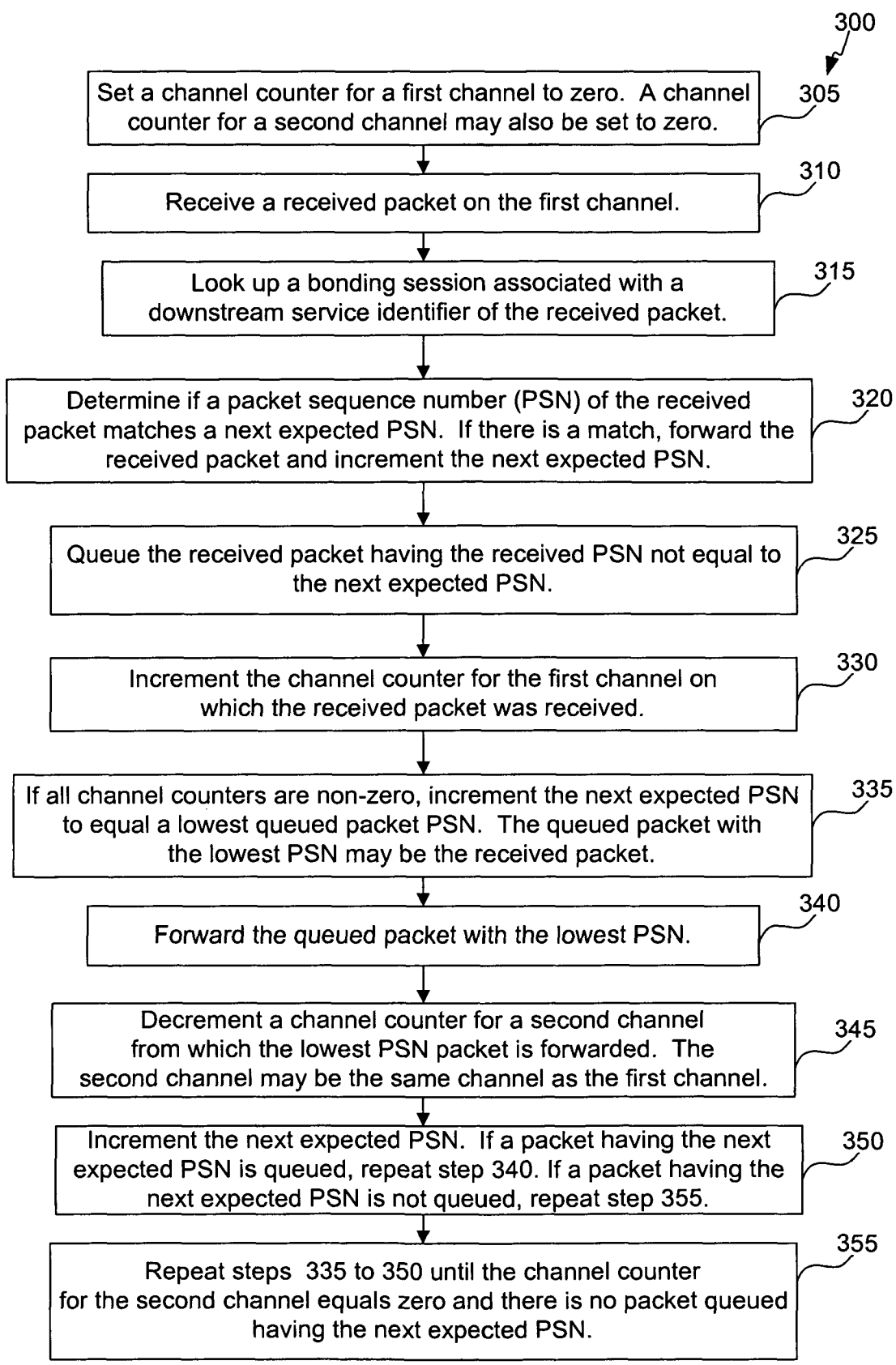
FIG. 3 is a flowchart of a further method for efficient rapid loss detection.

FIG. 3 is a flowchart of a further method for efficient rapid loss detection. In step 305, a channel counter for a channel is set to zero. A channel counter for a second channel may also be set to zero. In step 310, a packet is received on the first channel. In step 315, a bonding session associated with a DSID of the received packet is looked up. In step 320, it is determined if a PSN of the received packet matches a next expected PSN. If there is a match, the received packet is forwarded for processing and the next expected PSN is incremented. If there is no match, step 325 is performed. In step 325, the received packet is queued.

In step 330, the channel counter for the first channel is incremented. In step 335, if all channel counters are non-zero, the next expected PSN is incremented to equal a lowest queued packet PSN. The queued packet with the lowest PSN may be the received packet. In step 340, the queued packet with the lowest PSN is forwarded for processing. In step 345, a channel counter for the channel from which the lowest PSN packet is forwarded for processing is decremented. This channel may or may not be the first channel. In step 350, the next expected PSN is incremented. If a packet having the next expected PSN is queued, repeat step 340. If a packet having the next expected PSN is not queued, repeat step 335. In step 355, steps 335 to 350 are repeated until the channel counter for the second channel equals zero and there is no packet queued having the next expected PSN.

FIG. 4 illustrates an exemplary application 400 of efficient rapid loss detection in a bonding system. FIG. 4 shows a single bonding session with a DSID of one. The system has an RCS 402 of four channels numbered zero through three. A BCS of the session has three channels including channels zero, one, and two. The next expected PSN 408 is at ten. FIG. 4 shows a respective time 404 when packets ten through twenty are received, as well as the respective channel upon which each packet is received. Packets ten, fifteen, and seventeen are illustrated as lost due to errors on their respective channels. A blank entry for the channel at any time indicates that no packets are received on that channel at that time.

FIG. 4 also shows a channel counter 406 for each channel. The channel counter identification number corresponds with the number of the respective channel. Thus, channel counter one corresponds to channel one, etc. When the receiver queues a packet associated with a channel, the channel counter for that channel increments. When the receiver dequeues the packet associated with the channel, the channel counter for that channel decrements.

At time 0, packet ten is lost. The receiver expects packet ten, but does not know that packet ten is lost. The receiver receives no packets. All channel counters remain at zero. The next expected PSN is ten.

At time 1a, the receiver receives packet thirteen on channel zero. The received PSN of thirteen does not match the next expected PSN of ten. As a result, the receiver queues packet thirteen for later processing. Channel counter zero increments to equal one.

At time 1b, the receiver receives packet eleven on channel one. The received PSN of eleven does not match the next expected PSN of ten. Thus, the receiver queues packet eleven for later processing. Channel counter one increments to equal one.

At time 2a, the receiver receives packet fourteen on channel zero. The received PSN of fourteen does not match the next expected PSN of ten. Thus, the receiver queues packet fourteen for later processing. Channel counter zero increments by one to equal two. Also occurring at time 2a, packet fifteen is lost. The receiver expects packets ten and fifteen, but does not know that packets ten and fifteen are lost.

At time 2b, the receiver receives packet twelve on channel two. The received PSN of twelve does not match the next expected PSN of ten. Accordingly, the receiver queues packet twelve for later processing. Channel counter two increments by one to equal one.

At time 2c, all channel counters for the BCS are non-zero. Thus, at least one packet is in a queue for each channel in the BCS. Therefore, the receiver assumes the packet having the next expected PSN of ten is lost. The next expected PSN increments by one to equal eleven. The receiver dequeues packet eleven and forwards packet eleven for processing. When the receiver dequeues packet eleven, the channel counter for the channel from which the packet dequeues, channel one, decrements by one to equal zero.

The next expected PSN increments and the receiver sequentially dequeues and forwards packets for processing until the next expected PSN equals a PSN for a yet-to-be-received packet. Thus, the receiver sequentially dequeues and forwards the packets twelve through fourteen. The associated channel counters for channels zero and two decrement. When the next expected PSN equals fifteen, the dequeuing stops because packet fifteen has not been received. At the end of time 2c, no packets are queued for the BCS, packets ten and fifteen are lost, the next expected PSN is fifteen, and all channel counters for the BCS are zero. The receiver still expects packet fifteen, but does not know that packet fifteen is lost.

At time 3, the receiver receives packet sixteen on channel one. The received PSN of sixteen does not match the next expected PSN of fifteen. Therefore, the receiver queues packet sixteen for later processing. Channel counter one increments by one to equal one. Also occurring at time 3, packet seventeen is lost. The receiver expects packets fifteen and seventeen, but does not know that packets fifteen and seventeen are lost.

At time 4a, the receiver receives packet twenty on channel one. The received PSN of twenty does not match the next expected PSN of fifteen. Thus, the receiver queues packet twenty for later processing. Channel counter one increments by one to equal two.

At time 4b, the receiver receives packet eighteen on channel two. The received PSN of eighteen does not match the next expected PSN of fifteen. Thus, packet eighteen is queued for later processing. Channel counter two increments by one to equal one.

At time 5a, the receiver receives packet nineteen on channel zero. The received PSN of nineteen does not match the next expected PSN of fifteen. Therefore, packet nineteen is queued for later processing. Channel counter zero increments by one to equal one.

At time 5b, all channel counters for the BCS are non-zero. At least one packet is in a queue for each channel of the BCS. Therefore, the receiver assumes the packet having the next expected PSN of fifteen is lost. The next expected PSN increments by one to equal sixteen. The receiver dequeues packet sixteen and forwards packet sixteen for processing. When packet sixteen dequeues, the channel counter for the channel from which the packet dequeues, channel one, decrements by one to equal one.

The next expected PSN increments by one to become seventeen. However, there is no packet in the queue having a PSN of seventeen. Further, all channel counters for the BCS are still non-zero. Therefore, the receiver assumes the packet having the next expected PSN of seventeen is lost. The next expected PSN increments by one to equal eighteen. The receiver dequeues packet eighteen and forwards packet eighteen for processing. When packet eighteen dequeues, the channel counter for the channel from which the packet dequeues, channel two, decrements by one to equal zero.

Again, the next expected PSN increments until the next expected PSN equals a PSN for a yet-to-be-received packet. Thus, the receiver dequeues packets nineteen and then twenty and forwards packets nineteen and twenty for processing. The associated channel counters zero and one each decrement by one. When the next expected PSN equals twenty-one, the dequeuing stops because a packet having a PSN of twenty-one has not been received. At the end of time 5b, no packets are in the queue for the BCS, packets ten, fifteen, and seventeen are lost, the next expected PSN is twenty-one, and all channel counters for the BCS are zero.

At times 6 and 7, the receiver does not receive any packets. Further, no packets are in the queue for the BCS. Thus, all channel counters for the BCS remain at zero. The next expected PSN remains at twenty-one.

The representative functions described herein (e.g. channel counters, queues, etc.) may be implemented in hardware, software, or some combination thereof. For instance, signal processing functions may be implemented using a computer processor, computer logic, an application specific integrated circuit (ASIC), a digital signal processor (DSP), a field-programmable gate array (FPGA), digital logic circuits, etc., as will be understood by those skilled in the arts based on the description provided herein. Accordingly, any processor that performs the functions described herein is within the scope and spirit of the present invention.

Further, the signal processing functions described herein may be embodied by computer program instructions that are executed by a computer processor or any of the hardware devices described herein. The computer program instructions cause the processor to perform the functions described herein. The computer program instructions (e.g. software) may be stored in a computer usable medium, computer program medium, or any storage medium that may be accessed by a computer or processor. Such media include a memory device such as a RAM, ROM, or other type of computer data storage medium such as a computer disk, CD-ROM, or an equivalent. Accordingly, any computer data storage medium having computer program code that cause a processor to perform the functions described herein is within the scope and spirit of the present invention.

Figure 5:
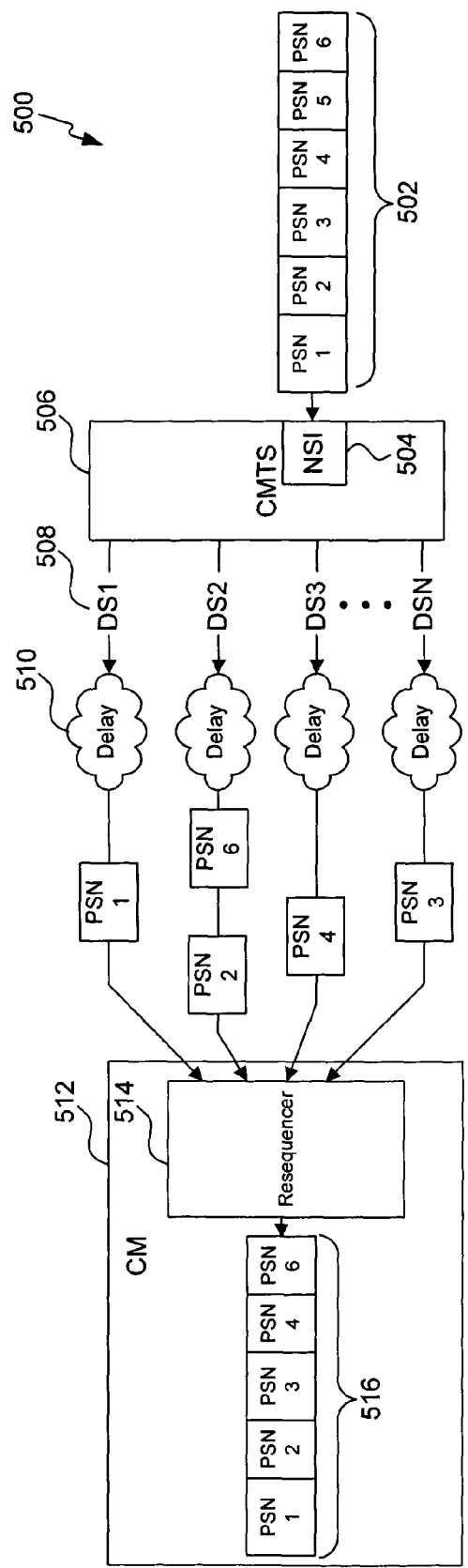
FIG. 5 is an illustration of a system for efficient rapid loss detection.

FIG. 5 is an illustration of a system 500 for efficient rapid loss detection. A sequence of packets 502 is input to a network side interface (NSI) 504 of a cable modem termination system (CMTS) 506. In this example, one of the processes the CMTS performs is transmission of data via multiple independent downstream (DS) communication channels 508. The CMTS 506 distributes the sequence of packets 502 among individual channels within the multiple independent communication channels 508. During transmission, the distributed packets experience delays 510 and errors that vary in duration by communication channel.

As a result of the delays 510, the sequence of packets 502 arrives at a cable modem (CM) 512 out of sequence. For example, packet two arrives at the CM 512 before packet one. As a result of an error, at least one packet within the sequence of packets 502 is hopelessly lost and never arrives at the CM 512. Packet five is illustrated as an example of a packet that was transmitted, but lost. Packets arriving at the CM 512 are input to a resequencer 514.

The resequencer 514 produces an output in the form of a stream of resequenced packets 516. Ideally, the stream of resequenced packets 516 should match the sequence of packets 502. However, this is not always the case because the stream of resequenced packets 516 does not contain packets that are lost during transmission. For example, the stream of resequenced packets 516 shown in FIG. 5 does not contain packet five.

Figure 6:
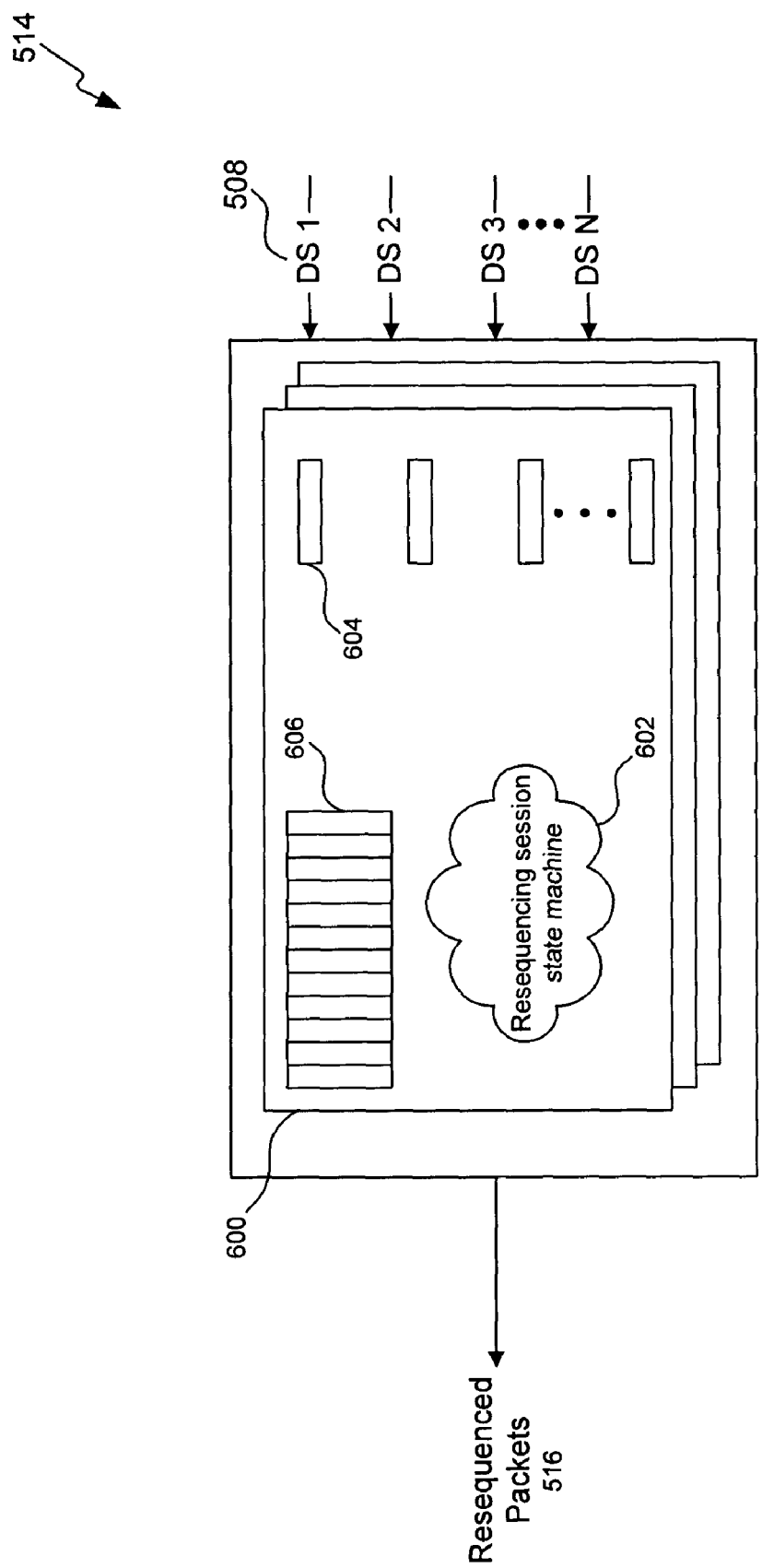
FIG. 6 is an illustration of a resequencer.

FIG. 6 is an illustration of the resequencer 514. The resequencer 514 performs a method for efficient rapid loss detection, such as a method described herein, in a bonding session 600. The resequencer 514 supports multiple resequencing sessions 600. The resequencer 514 routes an incoming packet to the proper resequencing session 600 based on the downstream service identifier (DSID) associated with the incoming packet.

Each resequencing session 600 has its own resequencing session state machine 602. The resequencing session state machine 602 utilizes channel counters 604, controls packet storage 606, and reorders the incoming packets by PSN. The resequencing session state machine 602 may perform at least a part of a method for efficient rapid loss detection. Each resequencing session 600 has packet storage 606 to queue an incoming packet. The per-channel counters 606 in each resequencing session 600 count a number of packets in the queue for the respective channel. In an example, the resequencing session state machine 602 is implemented as a finite state machine. Information such as a DSID in a packet header, a PSN, and a channel identifier select the finite state machine for the resequencing session 600.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present invention and the appended claims in any way.

What is claimed is:

1. A method for rapid loss detection in a bonding system including a plurality of channel counters, wherein each channel counter is associated with a respective one of a plurality of channels, comprising:
   (a) queuing a received packet having a packet sequence number (PSN) not equal to a next expected PSN;
   (b) incrementing a first channel counter for a first channel on which said received packet was received;
   (c) incrementing said next expected PSN to equal a lowest queued packet PSN if all channel counters are non-zero;
   (d) forwarding a lowest PSN packet having said lowest queued packet PSN; and
   (e) decrementing a second channel counter for a second channel from which said lowest PSN packet is forwarded.

2. The method of claim 1, further comprising setting said first channel counter for said first channel to zero.

3. The method of claim 1, further comprising:
   determining if said PSN matches said next expected PSN;
   if so, forwarding said received packet; and
   incrementing said next expected PSN.

4. The method of claim 1, further comprising repeating steps (c)-(e) until said second channel counter for said second channel equals zero and there is no packet queued having said next expected PSN.

5. The method of claim 1, further comprising looking up a bonding session associated with a downstream service identifier of said received packet.

6. The method of claim 1, wherein said first channel is said second channel.

7. The method of claim 1, wherein said received packet is said lowest PSN packet.

8. A non-transitory computer-readable medium having stored thereon a computer-executable instruction to perform a method for rapid loss detection in a bonding system including a plurality of channel counters, wherein each channel counter is associated with a respective one of a plurality of channels, the instruction when executed, causes performance of the steps of:
   (a) queuing a received packet having a packet sequence number (PSN) not equal to a next expected PSN;
   (b) incrementing a first channel counter for a first channel on which said received packet was received;
   (c) incrementing said next expected PSN to equal a lowest queued packet PSN if all channel counters are non-zero;
   (d) forwarding a lowest PSN packet having said lowest queued packet PSN; and
   (e) decrementing a second channel counter for a second channel from which said lowest PSN packet is forwarded.

9. The non-transitory computer-readable medium of claim 8, further having stored thereon a computer-executable instruction to cause performance of a step of setting said first channel counter for said first channel to zero.

10. The non-transitory computer-readable medium of claim 8, further having stored thereon a computer-executable instruction to cause performance of steps of:
    determining if said PSN matches said next expected PSN;
    forwarding said received packet; and
    incrementing said next expected PSN.

11. The non-transitory computer-readable medium of claim 8, further having stored thereon a computer-executable instruction to cause performance of a step of repeating steps (c)-(e) until said second channel counter for said second channel zero and there is no packet queued having said next expected PSN.

12. The non-transitory computer-readable medium of claim 8, further having stored thereon a computer-executable instruction to cause performance of a step of looking up a bonding session associated with a downstream service identifier of said received packet.

13. The non-transitory computer-readable medium of claim 8, wherein said first channel is said second channel.

14. The non-transitory computer-readable medium of claim 8, wherein said received packet is said lowest PSN packet.

15. A system for rapid loss detection in a bonding system including a plurality of channel counters, wherein each channel counter is associated with a respective one of a plurality of channels, comprising:
  (a) means for queuing a received packet having a packet sequence number (PSN) not equal to a next expected PSN;
  (b) means for incrementing a first channel counter for a first channel on which said received packet was received;
  (c) means for incrementing said next expected PSN to equal a lowest queued packet PSN if all channel counters are non-zero;
  (d) means for forwarding a lowest PSN packet having said lowest queued packet PSN; and
  (e) means for decrementing a second channel counter for a second channel from which said lowest PSN packet is forwarded.

16. The system of claim 15, further comprising means for setting said first channel counter for said first channel to zero.

17. The system of claim 15, further comprising:
  means for determining if said PSN matches said next expected PSN;
  means for forwarding said received packet; and
  means for incrementing said next expected PSN.

18. The system of claim 15, further comprising means for repeating steps (c)-(e) until said second channel counter for said second channel equals zero and there is no packet queued having said next expected PSN.

19. The system of claim 15, further comprising means for looking up a bonding session associated with a downstream service identifier of said received packet.

20. The system of claim 15, wherein said first channel is said second channel.

21. The system of claim 15, wherein said received packet is said lowest PSN packet.

* * * * *